United States Patent
Seo

(10) Patent No.: US 11,162,549 B2
(45) Date of Patent: Nov. 2, 2021

(54) METHOD FOR DIAGNOSING CLUTCH STUCK AND APPARATUS THEREOF

(71) Applicant: Vitesco Technologies GmbH, Hannover (DE)

(72) Inventor: HyeonDeok Seo, Seoul (KR)

(73) Assignee: VITESCO TECHNOLOGIES GMBH, Hannover (DE)

(*) Notice: Subject to any disclaimer, the term of this patent is extended or adjusted under 35 U.S.C. 154(b) by 86 days.

(21) Appl. No.: 16/605,031

(22) PCT Filed: Apr. 25, 2018

(86) PCT No.: PCT/EP2018/060530
§ 371 (c)(1),
(2) Date: Oct. 14, 2019

(87) PCT Pub. No.: WO2018/197528
PCT Pub. Date: Nov. 1, 2018

(65) Prior Publication Data
US 2021/0131508 A1    May 6, 2021

(30) Foreign Application Priority Data
Apr. 26, 2017 (KR) .................. 10-2017-0053970

(51) Int. Cl.
*F16D 48/06* (2006.01)
*F16H 61/12* (2010.01)
*F16D 66/00* (2006.01)

(52) U.S. Cl.
CPC ........... *F16D 48/064* (2013.01); *F16H 61/12* (2013.01); *F16D 2066/003* (2013.01);
(Continued)

(58) Field of Classification Search
CPC ......... F16D 48/064; F16D 2500/30401; F16D 2500/3166; F16D 2500/501;
(Continued)

(56) References Cited

U.S. PATENT DOCUMENTS 8,862,344 B2    10/2014  Zimmermann et al.
9,032,824 B2    5/2015   Arai
(Continued)

FOREIGN PATENT DOCUMENTS

DE    102008061564 A1    7/2009
DE    102012206422 A1    10/2013
(Continued)

OTHER PUBLICATIONS

International Search Report and Written Opinion for International Application No. PCT/EP2018/060530, dated Aug. 24, 2018, 9 pages.

*Primary Examiner* — Edwin A Young
(74) *Attorney, Agent, or Firm* — RatnerPrestia

(57) ABSTRACT

A stuck diagnosis apparatus and a method. The method for diagnosing clutch stuck includes allowing a control unit to turn off a clutch actuator after a clutch is engaged by driving of the clutch actuator, allowing the control unit to count a time elapsing from the turn-off time point of the clutch actuator so as to measure a time taken to reach a disengaged state of the clutch for interrupting engine power, and allowing the control unit to determine that the stuck occurs in the clutch when the clutch does not reach the disengaged state within a preset reference time.

3 Claims, 4 Drawing Sheets

(52) U.S. Cl.
CPC ............... *F16D 2500/3166* (2013.01); *F16D 2500/5108* (2013.01); *F16D 2500/70424* (2013.01); *F16H 2061/1208* (2013.01); *F16H 2061/128* (2013.01)

(58) Field of Classification Search
CPC ............. F16D 2500/70205; F16D 2500/5108; F16D 2500/70424; F16D 2066/003; F16H 61/12; F16H 2061/1208; F16H 2061/128
See application file for complete search history.

(56) References Cited

U.S. PATENT DOCUMENTS

| | | | |
|---|---|---|---|
| 9,709,165 B2* | 7/2017 | Shigenaga | F16H 61/12 |
| 9,989,108 B2* | 6/2018 | Kim | F16D 48/06 |
| 10,030,721 B2 | 7/2018 | Choi | |
| 2016/0116006 A1* | 4/2016 | Young | F16D 48/06 |
| | | | 701/67 |
| 2016/0146272 A1* | 5/2016 | Choi | G07C 5/02 |
| | | | 701/67 |

FOREIGN PATENT DOCUMENTS

| | | |
|---|---|---|
| DE | 102015223124 A1 | 5/2016 |
| EP | 2695783 A1 | 2/2014 |
| JP | 2006097886 A | 4/2006 |
| JP | 2014035066 A | 2/2014 |
| JP | 5460870 B2 | 4/2014 |
| KR | 100897097 B1 | 5/2009 |
| KR | 20100089221 A | 8/2010 |

\* cited by examiner

METHOD FOR DIAGNOSING CLUTCH STUCK AND APPARATUS THEREOF

CROSS REFERENCE TO RELATED APPLICATIONS

This application is the U.S. National Phase Application of PCT International Application No. PCT/EP2018/060530, filed Apr. 25, 2018, which claims priority to Korean Patent Application No. 10-2017-0053970, filed Apr. 26, 2017, the contents of such applications being incorporated by reference herein.

FIELD OF THE INVENTION

The present invention relates to a clutch stuck diagnosis method and apparatus, and more particularly, to a clutch stuck diagnosis method and apparatus for diagnosing clutch stuck by which an operation of a clutch mounted on a transmission is not controlled.

BACKGROUND OF THE INVENTION

A transmission means a device mounted on a vehicle and the like to generate an appropriate rotational speed and torque through a torque generating means such as an engine or a motor. Such a transmission may be represented by a manual transmission in which shifting is performed according to a manual operation of a driver and an automatic transmission in which shifting is automatically performed according to a vehicle speed or an engine load. Currently, automatic transmission is being widely used.

As one of these automatic transmissions, a double clutch transmission (DCT) provided with two power transmission clutches has been developed. The double clutch transmission selectively transmits rotational force input from an engine to two input sides by using two clutches and performs shifting while alternately the two clutches on the basis of a structure in which an output is realized after the shifting is performed using rotational force of gears disposed on the two input sides. Thus, there is an advantage that torque interruption hardly occurs even during the shifting.

On the other hand, in such an automatic transmission, there may occur a problem of 'clutch stuck' by which the clutch mounted therein is fixed in an engaged state, and thus an operation of the transmission is not controlled. For example, when a rotational speed of a transmission input shaft is detected as a value similar to that of a rotational speed of the engine although the clutch is in a fully disengaged state such as when the vehicle is in an idle state, there is a possibility that the clutch is in a stuck state, and when the idle state of the vehicle is released, and the gears are engaged in the stuck state of the clutch, there is a possibility of causing a serious accident due to sudden driving of the vehicle.

In addition, conventionally, there is a problem that only the post-operation with respect to the clutch stuck is possible because the stuck state of the clutch is determined only after the starting of the engine.

The background art of the present invention is disclosed in Korean Patent Publication No. 10-2010-0089221 (published on Aug. 12, 2010), incorporated herein by reference.

SUMMARY OF THE INVENTION

An aspect of the present invention has been made to solve the above-mentioned problems, and according to one aspect of the present invention is to provide a method and apparatus for diagnosing clutch stuck, through which the stuck of the clutch mounted on a transmission is diagnosed to prevent an accident from occurring, and the clutch stuck is diagnosed before starting of an engine as well as after the starting of the engine to prevent possibility of the occurrence of accidents.

A method for diagnosing clutch stuck according to an aspect of the present invention is characterized by including steps of allowing a control unit to turn off a clutch actuator after a clutch is engaged by driving of the clutch actuator, allowing the control unit to count a time elapsing from the turn-off time point of the clutch actuator so as to measure a time taken to reach a disengaged state of the clutch for interrupting engine power, and allowing the control unit to determine that the stuck occurs in the clutch when the clutch does not reach the disengaged state within a preset reference time.

In an aspect of the present invention, a time taken to reach the disengaged state of the clutch may be a self-opening time by reaction force of an elastic member that is pressed by the driving of the clutch actuator to engage or disengage the clutch.

In an aspect of the present invention, relationship information between a position of the clutch and the self-opening time in a normal state in which the stuck does not occur in the clutch may be previously set, and in the determination step, the control unit may extract the self-opening time with respect to the position of the clutch at the turn-off time point of the clutch actuator from the relationship information and determine that the stuck occurs in the clutch when the clutch does not reach the disengaged state within the extracted self-opening time.

An apparatus for diagnosing clutch stuck according to one aspect of the present invention is characterized by including a clutch interrupting power supplied from an engine to a transmission, a clutch actuator controlling engagement and dis-engagement of the clutch; and a control unit turning off the clutch actuator after the clutch is engaged by driving of the clutch actuator, counting a time elapsing from a turn-off time point of the clutch actuator to measure a time taken to reach a disengaged state of the clutch for interrupting engine power, and determines that the stuck occurs in the clutch when the clutch does not reach the disengaged state within a preset reference time.

In an aspect of the present invention, a time taken to reach the disengaged state of the clutch may be a self-opening time by reaction force of an elastic member that is pressed by the driving of the clutch actuator to engage or dis-engage the clutch.

In an aspect of the present invention, relationship information between a position of the clutch and the self-opening time in a normal state in which the stuck does not occur in the clutch may be previously set, and the control unit may extract the self-opening time with respect to the position of the clutch at the turn-off time point of the clutch actuator from the relationship information and determine that the stuck occurs in the clutch when the clutch does not reach the disengaged state within the extracted self-opening time.

In an aspect of the present invention, the clutch may be a dual clutch mounted on a dual clutch transmission (DCT).

According to the one aspect of the present invention, the stuck state of the clutch may be diagnosed early to prevent the accident due to the clutch stuck from occurring, and only the stuck diagnosis logic using the self-opening time without a separate additional component for diagnosing the clutch stuck to diagnose the clutch stuck may be applied to more economically and effectively diagnose the clutch stuck.

DETAILED DESCRIPTION OF THE PREFERRED EMBODIMENTS

Figure 1:
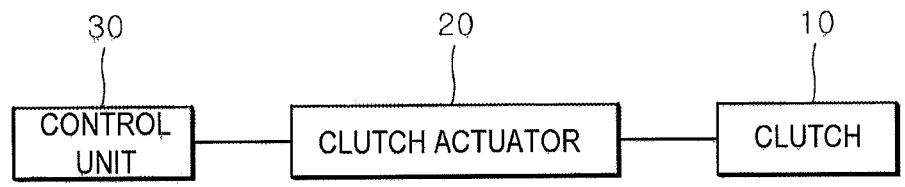
FIG. 1 is a block diagram for explaining an apparatus for diagnosing clutch stuck according to an embodiment of the present invention.

Hereinafter, an embodiment of a method and apparatus for diagnosing clutch stuck according to an aspect of the present invention will be described with reference to the accompanying drawings. In the description, the thickness of lines or the size of components shown in the drawings may be exaggerated for the clarity and convenience of the description. In addition, the following terms are defined in consideration of functions in an aspect of the present invention, and the definitions thereof may vary depending on the intention or practice of users or operators. Thus, definitions of the terms should be made based on the contents throughout this specification.

Figure 2:
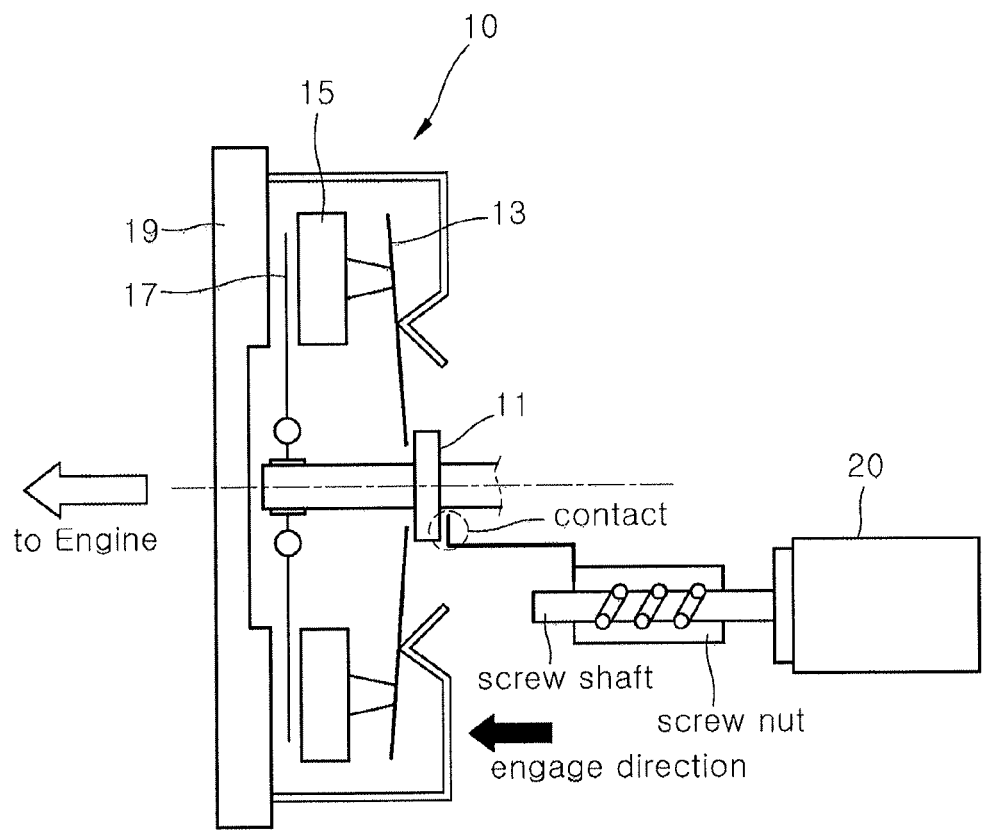
FIGS. 2 and 3 are views for explaining clutching engaging and dis-engaging operation in the apparatus for diagnosing the clutch stuck according to an embodiment of the present invention.
Figure 3:
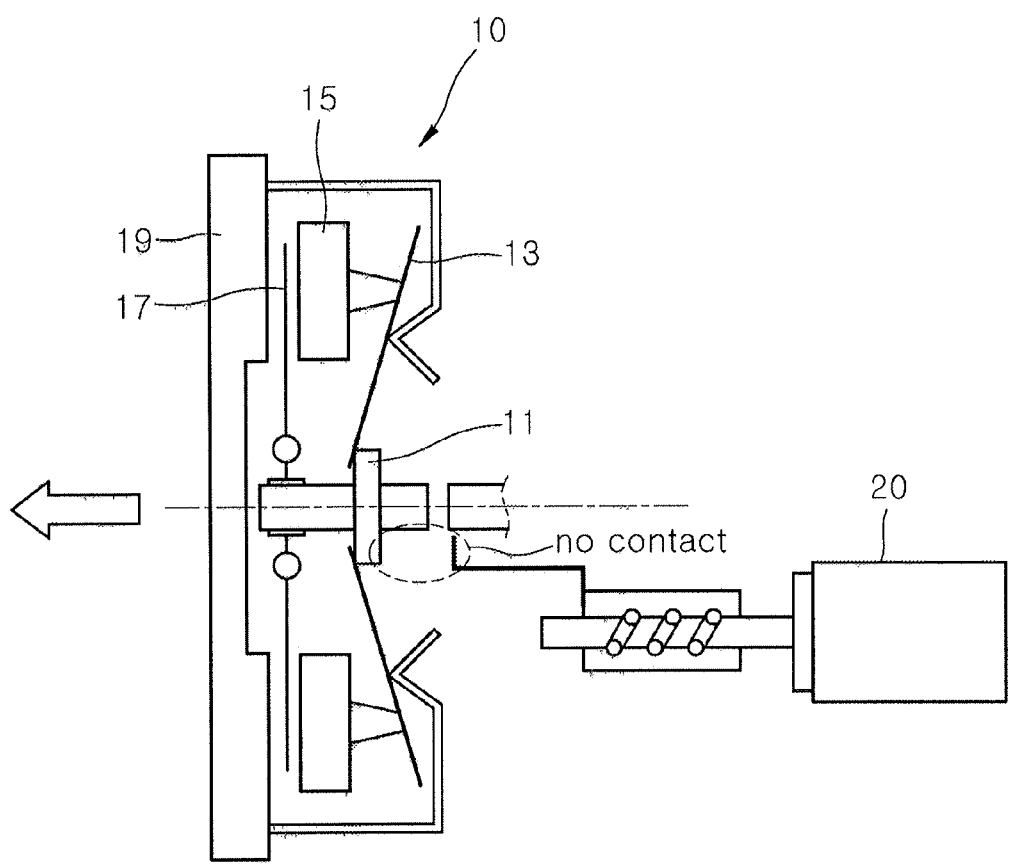

FIG. 1 is a block diagram for explaining an apparatus for diagnosing clutch stuck according to an embodiment of the present invention, and FIGS. 2 and 3 views for explaining clutching engaging and dis-engaging operation in the apparatus for diagnosing the clutch stuck according to an embodiment of the present invention.

Referring to FIGS. 1 to 3, an apparatus for diagnosing clutch stuck according to an embodiment of the present invention may include a clutch (10), a clutch actuator (20), and a control unit (30). The clutch (10) may include a pressing member (11), an elastic member (13), a pressure plate (15), a clutch disk (17), and a flywheel (19).

In this embodiment, although a dual clutch mounted on a dual clutch transmission is described as an example of the clutch (10) as illustrated in FIGS. 2 and 3, an aspect of the present invention is not limited thereto and may be applied to various clutches such as an automatic transmission and a continuously variable transmission.

The clutch (10) may interrupt power supplied from an engine to a transmission. For this, as illustrated in FIGS. 2 and 3, the clutch (10) may include the pressing member (11), the elastic member (13), the pressure plate (15), the clutch disk (17), and the flywheel (19). The pressing member (11) may be implemented by a release bearing or a thrust bearing, and the elastic member (13) may be implemented by a diaphragm spring, but they are not limited thereto.

The clutch actuator (20) may be controlled by a control unit that will be described later to control engagement and dis-engagement of the clutch (10). A motor is used as an example of the clutch actuator (20) according to this embodiment, but is not limited thereto, and thus may be implemented as a solenoid actuator that is a hydraulic actuator. The clutch actuator (20) may be designed to have a structure which is mechanically connected to the pressing member (11) through a screw shaft and a screw nut. Thus, a rotational motion of the motor may be converted into a linear motion to press the pressing member (11).

The engaging and dis-engaging operations of the clutch (10) will be briefly described based on the above-described configurations of the clutch (10) and the clutch actuator (20) with reference to FIGS. 2 and 3.

FIG. 2 illustrates a state in which the clutch actuator (20) is turned off to dis-engage the clutch (10). When the control unit (30) drives the clutch actuator (20), the rotational motion of the clutch actuator (20) may be converted into the linear motion through the screw shaft and the screw nut to press the pressing member (11), and the elastic member (13) and the pressing plate (15) may be pressed by the pressing member (11) in one direction to engage the clutch disk (17) with the flywheel (19) so that the clutch (10) is engaged. FIG. 3 illustrates a state in which the clutch actuator (20) is driven to engage the clutch (10).

When the control unit (30) turns off the clutch actuator (20), the elastic member (13) returns to its original state by the elastic force thereof to space the clutch disk (17) apart from the flywheel (19), thereby dis-engaging the clutch (10).

In this embodiment, although the dual clutch transmission is described as an example in which the clutch (10) is engaged when the clutch actuating actuator (20) is driven, and the clutch (10) is disengaged when the clutch actuator (20) is turned off, in some embodiments, the engagement and dis-engagement of the clutch (10) according to the operation of the clutch actuator (20) are implemented to be performed.

This embodiment is characterized in that the stuck of the clutch (10), which may occur during a normal operation of the above-described clutch (10), is diagnosed. Hereinafter, the configuration for diagnosing the stuck of the clutch (10) will be described in detail with reference to the operation of the control unit (30).

The control unit (30) may turn off the clutch actuator (20) after the clutch (10) is engaged by the driving of the clutch actuator (20), count a time elapsing from the turn-off time point of the clutch actuator (20) to measure a time taken to reach a disengaged state of the clutch (10) for interrupting engine power, and determine that the stuck occurs in the clutch (10) when the clutch (10) does not reach the disengaged state within a preset reference time.

Here, the time taken to reach the disengaged state of the clutch (10) means a self-opening time due to reaction force of the elastic member (13)(i.e., a diaphragm spring) that is pressed by the driving of the clutch actuator (20) to engage or dis-engage the clutch (10).

Relationship information between a position and a self-opening time of the clutch (10) in a normal state in which the stuck does not occur in the clutch (10) is previously set in the control unit (30). Thus, the control unit (30) may extract the self-opening time with respect to the position of the clutch (10) at the turn-off time point of the clutch actuator (20) from the relationship information and determine that the stuck occurs in the clutch (10) when the clutch (10) does not reach the disengaged state within the extracted self-opening time.

Hereinafter, a process of diagnosing the stuck of the clutch by the control unit (30) will be described with reference to FIGS. 4 to 6.

Figure 4:
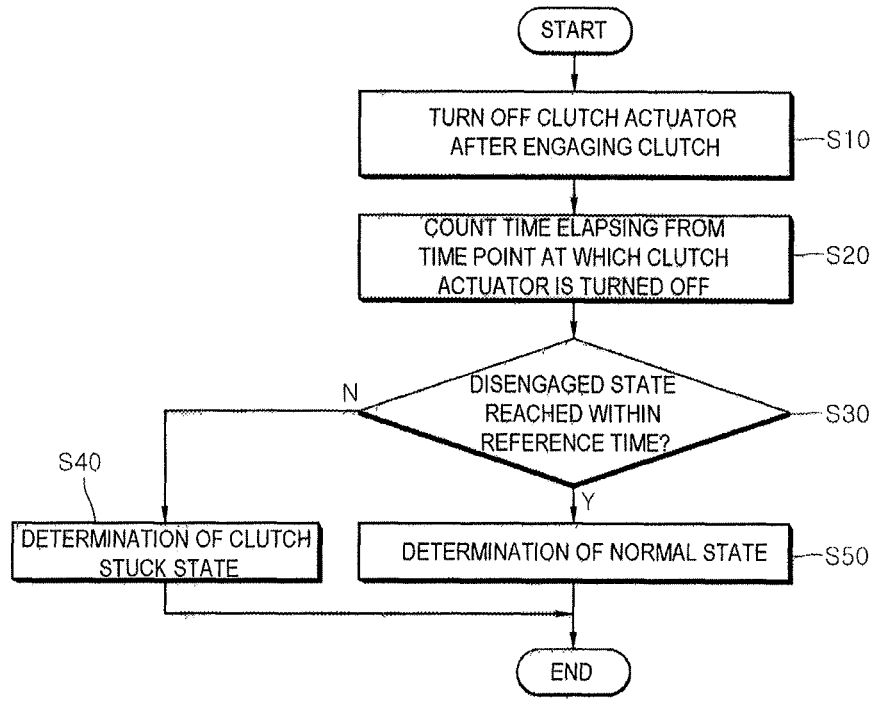
FIG. 4 is a flowchart for explaining the apparatus for diagnosing the clutch stuck according to an embodiment of the present invention.
Figure 5:
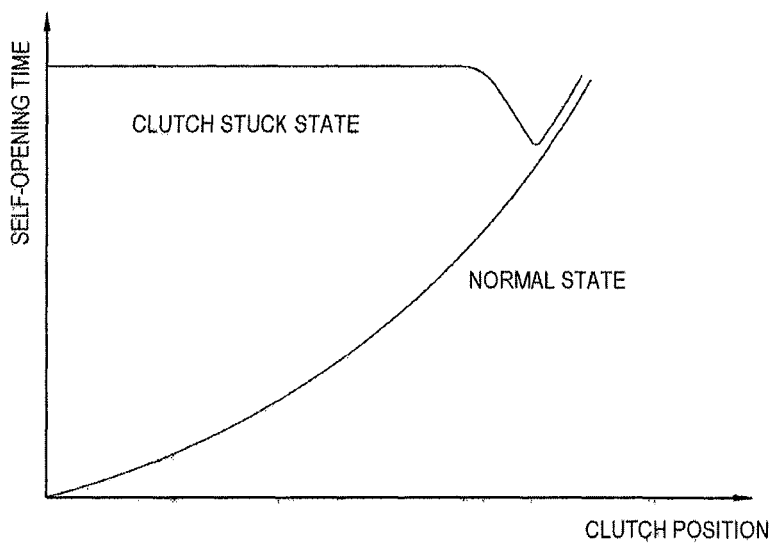
FIG. 5 is a view for explaining and comparing a self-opening time in a normal state and a self-opening time in a clutch stuck state in the method for diagnosing the clutch stuck according to an embodiment of the present invention.
Figure 6:
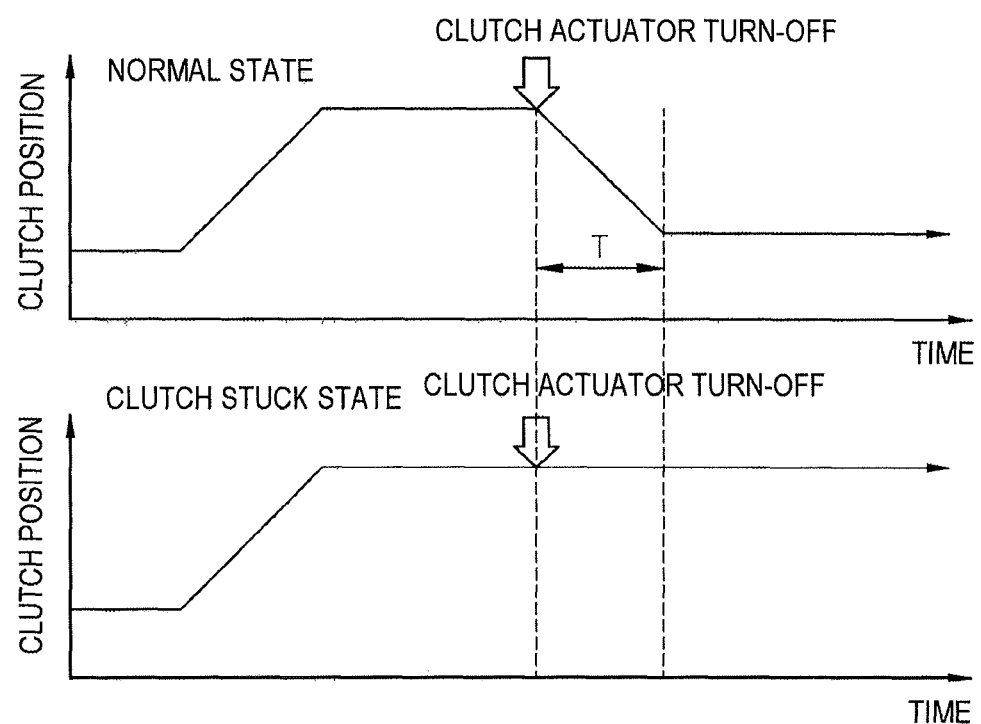
FIG. 6 is a view illustrating an example of relationship information between a position and a self-opening time of the clutch in the method for diagnosing the clutch stuck according to an embodiment of the present invention.

FIG. 4 is a flowchart for explaining the apparatus for diagnosing the clutch stuck according to an embodiment of the present invention, FIG. 5 is a view for explaining and comparing a self-opening time in the normal state and a self-opening time in the clutch stuck state in the method for diagnosing the clutch stuck according to an embodiment of the present invention, and FIG. 6 is a view illustrating an example of relationship information between a position and a self-opening time of the clutch in the method for diagnosing the clutch stuck according to an embodiment of the present invention.

Explaining the method for diagnosing the clutch stuck according to an embodiment of the present invention with reference to FIG. 4, first, the control unit (30) drives the clutch actuator (20) to engage the clutch (10) and then turn off the clutch actuator (20). That is, as described below, the control unit (30) first confirms the engaged state of the clutch (10) because the stuck of the clutch (10) is diagnosed based on the self-opening time that is a time taken to dis-engage the clutch (10) in the state in which the clutch (10) is engaged and turns off the clutch actuator (20) to measure the self-opening time when the engaged state of the clutch (10) is confirmed.

Then, the control unit (30) counts a time elapsing from the turn-off time point of the clutch actuator (20) to measure a time taken to reach the disengaged state in which the clutch (10) interrupts the engine power. The disengaged state of the clutch (10) for interrupting the engine power is as illustrated in FIG. 2.

Here, the time taken to reach the disengaged state of the clutch (10) means a self-opening time due to reaction force of the elastic member (13)(i.e., a diaphragm spring) that is pressed by the driving of the clutch actuator (20) to engage or dis-engage the clutch (10).

Particularly, a self-opening mechanism that is self-openable in an emergency may be applied to a dual clutch mounted on a dual clutch transmission, and the self-opening mechanism is executed according to reaction force (i.e., elastic force) of the elastic member (13). That is, when the clutch actuator (20) is turned off in the state in which the clutch (10) is engaged, the elastic member (13) returns to its original state by the reaction force of the elastic member (13), and the pressure applied to the pressure plate (15) may be released to space the clutch disk (17) apart from the flywheel (19) so that the clutch (10) reaches the disengaged state. Thus, the self-opening time is defined as a time taken to reach the disengaged state of the clutch (10) by the reaction force of the elastic member (13) from the turn-off time point of the clutch actuator (20) in the state in which the clutch (10) is engaged.

Then, when the clutch (10) does not reach the disengaged state within the preset reference time, the control unit (30) determines that the stuck occurs in the clutch (10).

Here, the reference time means the self-opening time in the normal state in which the stuck does not occur in the clutch (10) and may be variously designed based on experimental results and previously set in the control unit (30).

Thus, the control unit (30) counts the time elapsing from the turn-off time point of the clutch actuator (20) and determines that a considerable self-opening time is required, or the self-opening time is impossible when the clutch (10) does not reach the disengaged state within the reference time, thereby determining that the stuck occurs in the clutch (10). FIG. 5 is a view for comparing a self-opening time in the normal state and a self-opening time in the clutch stuck state.

Relationship information between a position and a self-opening time of the clutch (10) in a normal state in which the stuck does not occur in the clutch (10) is previously set in the control unit (30). Thus, the control unit (30) may extract the self-opening time with respect to the position of the clutch (10) at the turn-off time point of the clutch actuator (20) from the relationship information and determine that the stuck occurs in the clutch (10) when the clutch (10) does not reach the disengaged state within the extracted self-opening time. Here, the position of the clutch (10) means a degree of the engagement of the clutch (10) and be implemented by various parameters such as an engaged pressure between the disk (17) and the flywheel (19) and a pressure applied to the elastic member (13).

Particularly, the position of the clutch (10) and the self-opening time taken to reach the disengaged state are proportional to each other as illustrated in FIG. 6, and although the position of the clutch (10) in the state in which the clutch actuator (20) is turned off is variable, when the stuck of the clutch (10) is diagnosed by applying a uniform reference time, the possibility of false diagnosis may not be ruled out. Thus, in this embodiment, the self-opening time with respect to the position of the clutch (10) at the turn-off time point of the clutch actuator (20) is extracted from the relationship information in the step SLY, and when the clutch (10) does not reach the disengaged state within the extracted self-opening time, it may be determined that the stuck occurs in the clutch (10), thereby improving accuracy in the stuck diagnosis of the clutch (10) through a manner of applying a discriminative self-opening time in consideration of the position of the clutch (10) at the turn-off time point of the clutch actuator (2Q).

When it is determined that the stuck occurs in the clutch (10), the control unit (30) according to this embodiment may audibly warn the driver that the clutch (10) needs to be repaired through a display or a speaker on a cluster unit.

As described above, the clutch (10) according to this embodiment may be implemented as the dual clutch mounted on the dual clutch transmission. Thus, the method for diagnosing the clutch stuck according to this embodiment may be applied to diagnose the stuck on all the clutch that is in the engaged state and the clutch that is in the disengaged state.

Also, in the method for diagnosing the clutch stuck according to this embodiment, the stuck of the clutch (10) may be diagnosed in the manner using the self-opening time of the clutch (10) regardless of whether the engine is turned on and off, and thus, the stuck state of the clutch (10) may be detected not only after the engine start but also before the engine start.

As described above, in this embodiment, the stuck state of the clutch may be diagnosed early to prevent the accident due to the clutch stuck from occurring, and only the stuck diagnosis logic using the self-opening time without a separate additional component for diagnosing the clutch stuck to diagnose the clutch stuck may be applied to more economically and effectively diagnose the clutch stuck.

While an aspect of the present invention has been particularly shown and described with reference to exemplary embodiments thereof, it will be understood by those of ordinary skill in the art that various changes in form and details may be made therein without departing from the spirit and scope of an aspect of the invention as defined by the appended claims. Therefore, the technical protection scope of an aspect of the present invention should be defined by the following claims.

10: Clutch
11: Pressing member
13: Elastic member
15: Pressing plate 17: Clutch disc
19: Flywheel
20: Clutch actuator
30: Control unit

The invention claimed is:

1. A method for diagnosing clutch stuck, comprising:
allowing a control unit to turn off a clutch actuator after a clutch is engaged by driving of the clutch actuator;
allowing the control unit to count a time elapsing from the turn-off time point of the clutch actuator so as to measure a time taken to reach a disengaged state of the clutch for interrupting engine power; and
allowing the control unit to determine that the stuck occurs in the clutch when the clutch does not reach the disengaged state within a preset reference time,
wherein the time taken to reach the disengaged state of the clutch is a self-opening time due to a reaction force of an elastic member that is pressed by the driving of the clutch actuator to engage or disengage the clutch,
relationship information between a position of the clutch and the self-opening time in a normal state in which the stuck does not occur in the clutch is previously set, and
in the determination step, the control unit extracts the self-opening time with respect to the position of the clutch at the turn-off time point of the clutch actuator from the relationship information and determines that the stuck occurs in the clutch when the clutch does not reach the disengaged state within the extracted self-opening time.

2. An apparatus for diagnosing clutch stuck, comprising:
a clutch interrupting power supplied from an engine to a transmission;
a clutch actuator controlling engagement and dis-engagement of the clutch; and
a control unit turning off the clutch actuator after the clutch is engaged by driving of the clutch actuator, counting a time elapsing from a turn-off time point of the clutch actuator to measure a time taken to reach a disengaged state of the clutch for interrupting engine power, and determine that the stuck occurs in the clutch when the clutch does not reach the disengaged state within a preset reference time,
wherein time taken to reach the disengaged state of the clutch is a self-opening time due to a reaction force of an elastic member that is pressed by the driving of the clutch actuator to engage or disengage the clutch, and
wherein relationship information between a position of the clutch and the self-opening time in a normal state in which the stuck does not occur in the clutch is previously set, and in the determination step, the control unit extracts the self-opening time with respect to the position of the clutch at the turn-off time point of the clutch actuator from the relationship information and determines that the stuck occurs in the clutch when the clutch does not reach the disengaged state within the extracted self-opening time.

3. The apparatus for diagnosing the clutch stuck of claim 2, wherein the clutch is a dual clutch mounted on a dual clutch transmission (DCT).

* * * * *